US011606549B1

(12) United States Patent
Harwit (10) Patent No.: US 11,606,549 B1
(45) Date of Patent: Mar. 14, 2023

(54) METHODS AND SYSTEMS FOR MITIGATING PERSISTENCE IN PHOTODETECTORS (71) Applicant: Ball Aerospace & Technologies Corp., Boulder, CO (US)

(72) Inventor: Alex Harwit, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 256 days.

(21) Appl. No.: 16/912,476

(22) Filed: Jun. 25, 2020

Related U.S. Application Data (60) Provisional application No. 62/866,941, filed on Jun. 26, 2019.

(51) Int. Cl.
*H04N 17/00* (2006.01)
*H04N 5/235* (2006.01)
*H04N 5/225* (2006.01)

(52) U.S. Cl.
CPC ......... *H04N 17/002* (2013.01); *H04N 5/2256* (2013.01); *H04N 5/2353* (2013.01); *H04N 5/2354* (2013.01)

(58) Field of Classification Search
CPC .. H04N 17/002; H04N 5/2256; H04N 5/2353; H04N 5/2354
See application file for complete search history.

(56) References Cited

U.S. PATENT DOCUMENTS

| | | | | |
|---|---|---|---|---|
| 6,968,093 B1 * | 11/2005 | Boisvert | ............ | H04N 1/00013 382/270 |
| 7,009,636 B2 * | 3/2006 | Liu | .............. | H04N 5/2355 348/297 |
| 7,808,538 B2 * | 10/2010 | Shan | ............... | H01L 27/14654 348/297 |
| 8,259,179 B2 * | 9/2012 | Pertsel | ............... | H04N 5/2354 348/187 |
| 10,154,256 B1 * | 12/2018 | Segapelli | ............... | G03B 7/17 |

(Continued)

FOREIGN PATENT DOCUMENTS

WO    WO-2010084493 A1 *  7/2010  ............. H04N 5/235

OTHER PUBLICATIONS

"About WFC3," Space Telescope Science Institute, 8 pages [retrieved online Sep. 1, 2020 from: https://www.stsci.edu/hst/instrumentation/wfc3].

(Continued)

*Primary Examiner* — Michael Lee
(74) *Attorney, Agent, or Firm* — Sheridan Ross P.C.

(57) ABSTRACT

Image sensor systems and methods that mitigate the effects of electronic image sensor persistence are provided. The mitigation of persistence is achieved by flooding the pixels of the image sensor with light, saturating all of the pixels, prior to the collection of desired image data. Moreover, after saturating the pixels, but prior to collecting the desired image, the image sensor is reset and operated to take an image of a black scene. Due to persistence from the prior saturation step, the image of the black scene appears as a gray image. The image sensor is then optionally reset and is again saturated. After another reset operation, a desired image is obtained. The gray image is then subtracted from the desired image, to substantially correct for the effects of persistence in that image.

23 Claims, 6 Drawing Sheets

(56) References Cited

U.S. PATENT DOCUMENTS

| | | | |
|---|---|---|---|
| 2008/0112651 A1* | 5/2008 | Cho | H04N 3/155 348/E3.018 |
| 2009/0261235 A1* | 10/2009 | Lahav | H04N 5/35572 257/292 |
| 2010/0026838 A1* | 2/2010 | Belenky | H04N 5/35536 348/E5.037 |
| 2010/0066858 A1* | 3/2010 | Asoma | H04N 5/2353 348/229.1 |
| 2011/0013064 A1* | 1/2011 | Lahav | H04N 5/378 348/E5.091 |
| 2012/0274838 A1* | 11/2012 | Teggatz | G03B 15/05 348/371 |
| 2013/0038785 A1* | 2/2013 | Song | H04N 5/2353 348/E5.037 |
| 2013/0258151 A1* | 10/2013 | Ayers | H04N 5/3592 348/E5.091 |
| 2014/0186026 A1* | 7/2014 | Oshima | H04B 10/516 398/25 |
| 2014/0240568 A1* | 8/2014 | Yamagata | H04N 5/378 348/308 |
| 2014/0247985 A1* | 9/2014 | Park | G06T 5/50 382/170 |
| 2015/0009397 A1* | 1/2015 | Yamamoto | H04N 5/335 348/367 |
| 2015/0264257 A1* | 9/2015 | Tanaka | H04N 5/23229 348/241 |
| 2016/0241800 A1* | 8/2016 | Shin | H04N 5/2173 |
| 2017/0195589 A1* | 7/2017 | Kovacovsky | H04N 13/246 |
| 2020/0195855 A1* | 6/2020 | Sakato | H04N 5/2353 |

OTHER PUBLICATIONS

"Description of JWST persistence Correction Algorithm," Space Telescope Science Institute, 2020, 5 pages [retrieved online from: jwst-pipeline.readthedocs.io/en/latest/jwst/persistence/description.html].

Auyeung et al. "Teledyne Detector Update," Detectors for the Extremely Large Telescopes, Oct. 23, 2015, Pasadena, California, 16 pages [retrieved online from: www.gmto.org/wp-content/uploads/TELEDYNE%20Detector%20Update%20(for%20ELTs)%20-%2023%20Oct%202015.pdf].

Blank et al. "H2RG focal plane array and camera performance update," Proceedings of SPIE, Sep. 2012, vol. 8453, 845310, 16 pages.

Deustua et al. "Persistence and count-rate nonlinearity in the HST WFC3 IR detector," Proceedings of SPIE, Aug. 2010, vol. 7731, 77313C.

Figer et al. "HgCdTe Detectors Grown on Silicon Substrates for Observational Astronomy," Proc of SPIE, 2018, vol. 10709, 1070926, 15 pages.

Kimble et al. "In-Flight Performance of the Detectors on HST/Wide Field Camera 3," European Southern Observatory, 2009, 17 pages [retrieved online from: www.eso.org/sci/meetings/2009/dfa2009/Writeups/WR-Kimble-paper.pdf].

Leisenring et al. "Characterizing persistence in JWST NIR Cam flight detectors," Proc. of SPIE, 2016, vol. 9915, 99152N (abstract).

Long et al. "Persistence in the WFC3 IR Detector: Intrinsic Variability," WFC3 Instrument Science Report 2018-3, Mar. 2018, 19 pages.

Long et al. "Characterizing Persistence in the IR detector within the Wide Field Camera 3 Instrument on Hubble Space Telescope," Proceedings of SPIE, 2012, vol. 8442, 84421W, 10 pages.

Long et al. "Characterizing Persistence in the WFC3 IR Channel: Finite Trapping Times," WFC3 Instrument Science Report 2013-6, Jul. 2013, 11 pages.

Long et al. "Persistence in the WFC3 IR Detector: An Improved Model Incorporating the Effects of Exposure Time," WFC3 Instrument Science Report 2015-15, Sep. 2015, 18 pages.

McLeod et al. "Mitigation of H2RG persistence with image illumination," Pre. of SPIE, 2016, vol. 9915, 99150G.

Smith et al. "A theory for image persistence in HgCdTe photodiodes," Proceedings of SPIE, Jul. 2008, vol. 7021, 70210J, 13 pages.

Smith et al. "Calibration of image persistence in HgCdTe photodiodes," Proceedings of SPIE, Jul. 2008, vol. 7021, 70210K, 13 pages.

Tulloch et al. "Predictive model of persistence in H2RG detectors," Journal of Astronomical Telescopes, Instruments, and Systems, 2019, vol. 5, No. 3, 036004, 26 pages.

Tulloch "Persistence Characterisation of Teledyne H2RG detectors," Scientific Detector Workshop 2017, Baltimore, MD, 2017, 12 pages [retrieved online from: arxiv.org/ftp/arxiv/papers/1807/1807.05217.pdf].

* cited by examiner

METHODS AND SYSTEMS FOR MITIGATING PERSISTENCE IN PHOTODETECTORS

CROSS-REFERENCE TO RELATED APPLICATIONS

This application claims the benefit of U.S. Provisional Patent Application Ser. No. 62/866,941, filed Jun. 26, 2019, the entire disclosure of which is hereby incorporated herein by reference.

FIELD

Methods and systems for mitigating the effects of persistence in photodetectors are provided.

BACKGROUND

Photodetectors, including but not limited to complementary metal oxide semiconductor (CMOS) image sensors and charge-coupled device (CCD) image sensors, are widely used in various applications. For instance, electronic or digital image sensors are commonly used in general-purpose cameras, satellite or other remote imaging applications, and the like. In addition, electronic image sensors are used in various medical applications. As still another example, electronic image sensors are used in spectrometers and other instruments.

A typical photo detector converts incident light into electrical charge. The amount of charge produced during an exposure period is generally proportional to the number of photons received by the photo detector during the exposure period. As can be appreciated by one of skill in the art, an electronic image sensor operates by transferring the charge produced in a photosensitive site or pixel of a detector to a floating diffusion or other charge to voltage detector. The pixel is then reset, in anticipation of receiving light in connection with a next exposure period, for example as part of the next image frame.

Photodetectors are generally characterized by a set of performance metrics that include quantum efficiency (the ability to convert photons of light into an electrical signal), dark current (the electrical signal produced in the absence of light), read noise (the excess noise produced when the detector is read out), and persistence (the electrical signal produced in a read of the detector due to photons received that contributed to an electrical signal in a prior read or reads of the detector), etc. The persistence of a photo detector, which is the aspect of photo detector performance specifically addressed by the present disclosure, has been a chronic problem in the field of electronic image sensors. Persistence can interfere with the quality of images obtained in temporal proximity to one another. For example, persistence in an image sensor can interfere with a measurement, for example where a measurement instrument incorporates a photo detector. As another example, persistence has the potential to interfere with astronomical surveys requiring precision photometry, astrometry, shape measurement, and spectroscopy.

Image persistence can appear in a sensor as an elevated dark current caused by a prior illumination of the sensor. A possible process to explain the origins of persistence is the capture of charge by traps exposed to carriers as the depletion width shrinks when photo-generated charge accumulates on the electrically isolated photodiode. After the depletion width is reestablished by resetting the diode, trapped charge is slowly released, appearing to be a signal during a subsequent exposure. (See, Smith et al., SPIE 70210) (2008)). Accordingly, image persistence can appear as an elevated dark current caused by prior illumination of a photo detector.

Efforts to reduce or eliminate the effects of persistence in image sensors have included the construction of models of such effects. In particular, by modeling the effects of persistence in an image sensor under particular conditions, those effects, as modeled, can be removed from an image collected under those conditions. However, such systems can be difficult to implement, and can lack desired levels of prediction accuracy. For example, subtracting image components resulting from persistence in a sensor from a collected image based on model data can lack desired levels of accuracy, even where the model itself is relatively accurate, because the amount of signal that should be subtracted depends on the time history of each of the sensor pixels. Moreover, approaches that use models to reduce the effects of persistence may not accurately account for changes to the sensor that occur over time in operation, operating conditions outside of those that have been modeled, or other variables. Alternatively, there have been suggestions that persistence in an image sensor can be reduced by saturating the pixels, and then waiting some number of hours before taking a first image. However, the effect of this technique in removing or reducing the effect of persistence between subsequent images has at best been limited.

Other approaches have implemented or proposed changes to the structures of the detector, and in particular to the photodiodes, the semiconductor materials used to implement the photodiodes, and/or amplifier structures. However, the required improvements in materials technology have been elusive. Accordingly, there remains a need for practical systems and methods that can be implemented to reduce or eliminate persistence in photodetectors.

SUMMARY

Embodiments of the present disclosure provide methods and systems for reducing the effects of image persistence in photodetectors. As used herein, persistence is the electrical signal produced in a read of a photo detector due to photons received during a prior exposure period and that contributed to an electrical signal in a prior read of the detector. Embodiments of the present disclosure can be applied in connection with cameras, spectrometers, star trackers, or any other instrument employing a photo detector subject to the effects of image of persistence.

Methods in accordance with embodiments of the present disclosure include initialization or calibration steps. A first step of an initialization process includes saturating an image sensor with input light. Saturating the image sensor can include exposing the photosensitive sites or pixels of the image sensor to a number of photons during an exposure period that results in the production of electrical charge in an amount that exceeds the charge holding capacity of the pixels. After saturating the image sensor, the image sensor is reset, and an image of a black scene or a dark frame is collected. The results, which may be considered a "gray" image, is the persistent image following a saturated exposure, in which all the pixels are initially filled with electrical carriers as a result of the saturation or flooding step. In accordance with at least some embodiments of the present disclosure, the process of saturating the image sensor, resetting, and taking an image of a black scene can be repeated multiple times (e.g. 100 times), and the results averaged, to obtain a low noise image of how the signal decays after the photodetector has been saturated. The acquisition of the low noise reference image completes the calibration process.

After the low noise reference image has been acquired, an image or a signal of interest can be obtained. More particularly, the process of obtaining an image or signal of interest includes saturating the image sensor with input light and resetting the image sensor. In accordance with embodiments of the present disclosure, the reset operation can include performing a readout operation, and returning the charge levels in the pixels to a baseline value. Next, the image sensor is operated to obtain a frame of data comprising the image or signal data. The image or signal data is stored as "unprocessed image data". The low noise reference image of the signal decay obtained during the calibration process is then subtracted from the "unprocessed image data". The resulting "processed image data" is an image substantially free of persistence, or an image that suffers from a much smaller persistence signal than would be present if the persistence mitigation procedure of embodiments of the present disclosure were not used. For precise measurements, all detectors are fully calibrated prior to use to characterize their photoresponse, i.e. the signal they produce when illuminated with a certain quantity of light. This is the case here as well, however, the detector full calibration has to be completed using the "processed image data".

In accordance with still other embodiments of the present disclosure, methods for obtaining images or signals of interest with reduced persistence from other images can include obtaining image data without first obtaining a reference image. In such embodiments, immediately prior to obtaining each image or signal of interest, the image sensor is saturated and reset.

Systems in accordance with embodiments of the present disclosure can include an image sensor, a lens or curved mirror assembly that directs incident light to the image sensor, a memory, and a processor. In accordance with at least some embodiments of the present disclosure, the systems can include a light source that is operable to provide light to the image sensor at levels capable of saturating the image sensor. The image sensor can include one or more pixels. Moreover, the image sensor can include an electronic analog or digital image sensor device, such as a complementary metal oxide semiconductor (CMOS) or charge coupled device (CCD) sensor having one or more photosensitive sites. For example, the image sensor can include an array of photosensitive sites or pixels. The processor can execute application programming or instructions for implementing a method or process as described herein. More particularly, the processor can operate to calibrate the image sensor by obtaining an average persistence signal, which can be subtracted from an image obtained from a scene, to remove or mitigate the effect of persistence in the obtained image. The programming or instructions and the image data can be stored in the memory. In accordance with still other embodiments of the present disclosure, pointing mechanisms, shutters, lens systems, power supplies, communication interfaces, and the like can be included in the system.

Additional features and advantages of embodiments of the present disclosure will become more readily apparent from the following description, particularly when considered together with the accompanying drawings.

DETAILED DESCRIPTION

Figure 1A:
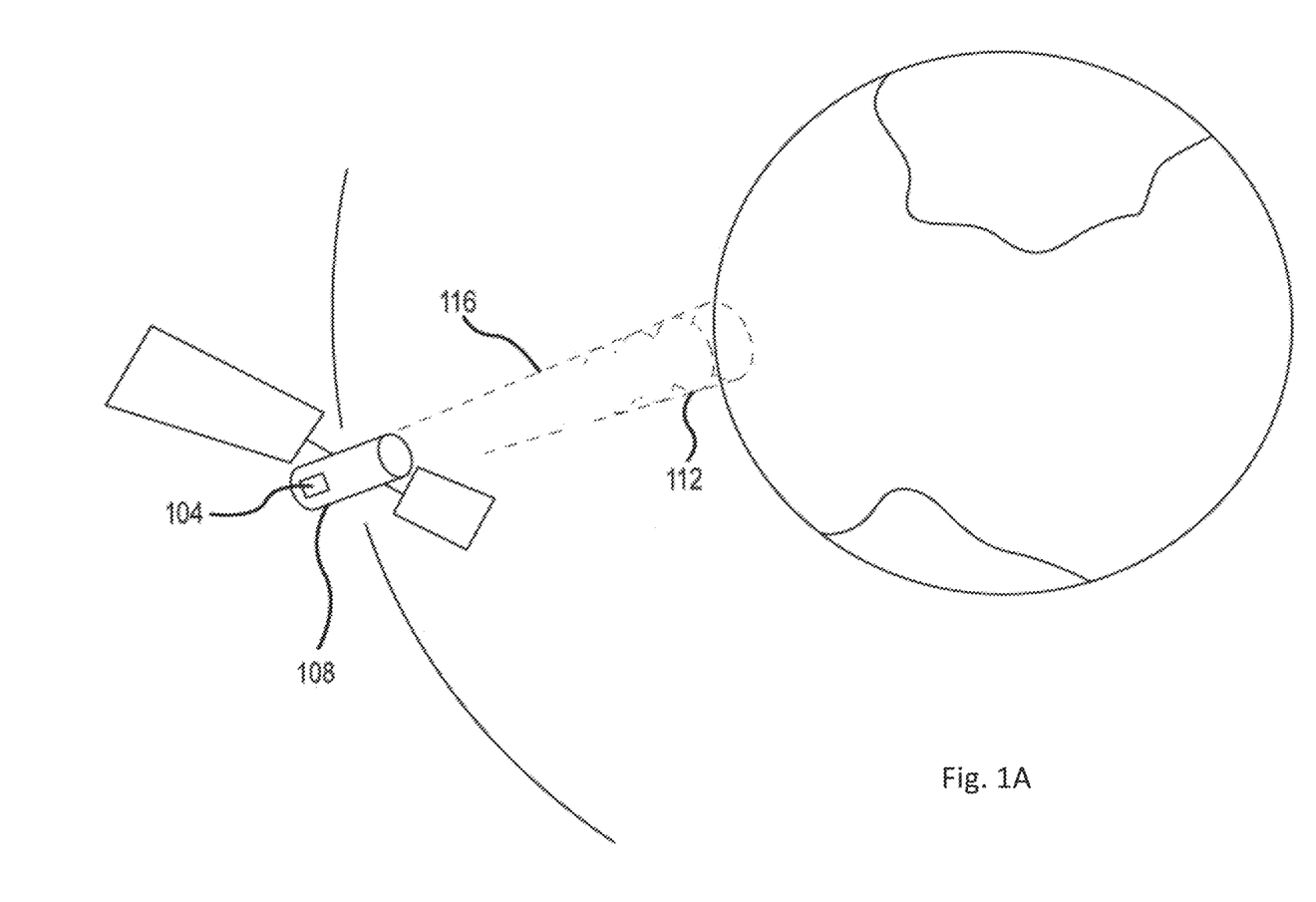
FIGS. 1A and 1B depict example scenarios in which image sensors in accordance with embodiments of the present disclosure are used to obtain data.
Figure 1B:
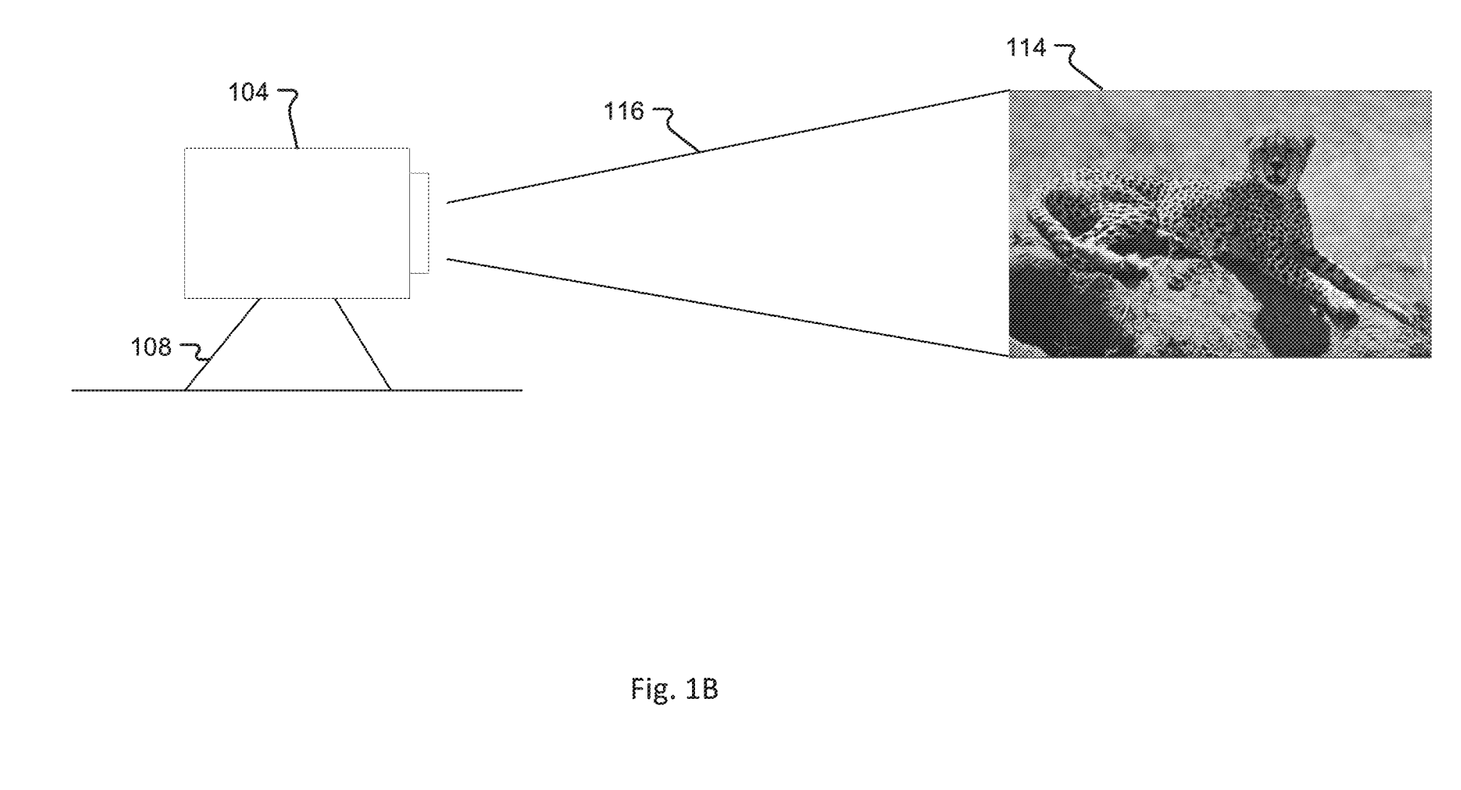

FIGS. 1A and 1B depict a sensor system 104 in accordance with embodiments of the present disclosure in example scenarios. More particularly, in FIG. 1A, the sensor system 104 is carried by a platform 108 that is orbiting the earth. In this first example scenario, the sensor system 104 may be in the form of a spectrometer that is operated to obtain information regarding trace gases in the atmosphere from a target volume 112 within a field of view 116 of the sensor system 104. In FIG. 1B, the sensor system 104 is carried by or mounted to a platform 108 that places the sensor system 104 in position to obtain an image of a scene 114 within a field of view 116 of the sensor system 104. Although particular example scenarios in which embodiments of the present disclosure for eliminating or reducing persistence in sensor systems can be applied are illustrated, it should be appreciated that other scenarios can usefully employ the methods and systems disclosed herein. In particular, embodiments of the present disclosure can be applied to any imaging device or photonic sensor in which light incident on a detector of a sensor system 104 is converted to an electrical charge.

Figure 2:
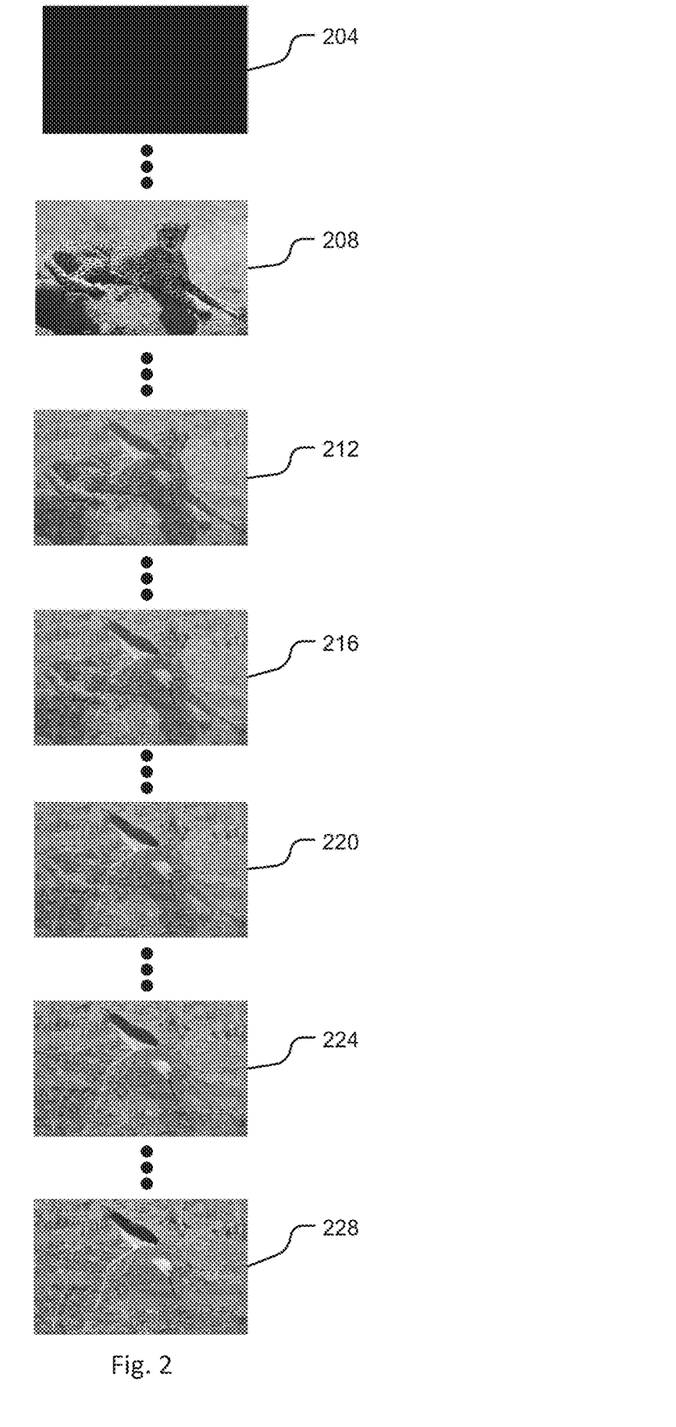
FIG. 2 depicts the effect of image sensor persistence.

FIG. 2 depicts the effect of image sensor persistence in the context of visible light images. However, as can be appreciated by one of skill in the art after consideration of the present disclosure, the problem of image persistence can also adversely affect data collected by detectors or image sensors used in spectrometers, infrared, visible, and other wavelength sensors, radiological sensors, or the like. In general, image sensor persistence is the corruption of a current image frame with persistent images or artifacts from one or more prior frames of image data. In the illustrated example, a movie or video first showing an hour of a black wall followed by five minutes of a cat (cheetah) followed by five minutes of a bird is depicted. Assume the persistence has an amplitude of 5% and a time constant of 0.1 seconds. When one views the video, one will see 1 hour of a black wall 204 followed by 5 minutes of a cat 208 followed by a first frame 212 showing the bird with a 5% image (ghost) of the cat. The next frame (at 60 FPS) 216 would have the bird with a 5%×exp [(−1/60 sec/0.1 sec)]=4.2% ghost image of the cat. The 6th frame 220 after the switch to the bird would show the bird with a 5%×exp [(−6/60 sec/0.1 sec)]=1.8% ghost image of the cat. The 30th frame 224 (about a half second) after the switch to the bird would show the bird with a 5%×exp [(−30/60 sec/0.1 sec)]=0.03% ghost image of the cat. The 60th frame 228 (about a second) after the switch to the bird would show the bird with a 5%×exp [(−60/60 sec/0.1 sec)]=0.0002% ghost image of the cat. This effect is illustrated in FIG. 2, where the persistence magnitude has been increased to show the effect.

While the example of FIG. 2 may not seem particularly concerning, let us now consider a different simplified example with a different persistence amplitude and time constant. Consider an instrument that flies in an airplane collecting data on the abundance of leaves in a forest. The instrument is required to be accurate to 1%. The instrument principle of operation is that as the airplane flies overhead, if there is a lot of green reflected light then there must be a large number of leaves in the field of view.

Consider the following:

1. The airplane files at 100 meters per second (0.1 km per second or 360 km per hour or 224 miles per hour).

2. The instrument has a field of view of 1 meter and collects 100 images per second (1/100 second per frame).

3. The plane is flying perpendicular to rows that have been clear cut to harvest wood in the forest 4. For every 3 meter wide row of trees that still remain, there is a 30 meter wide area that has been clear cut 5. Assume the detector persistence is 4% and has a decay time of 1 second 6. As the plane flies over the 3 meter wide trees it collects 3 images in 3/100 second of 100 percent signal 7. Then it flies over the first clear cut area and measures a signal of 4%×exp [−(1/100)/1]=3.96%.

8. As it flies over the last patch of clear cut area it measures a signal of 4%×exp [−(30/100)/1]=2.96%

9. The actual percent of forest that remains is (3×100%+30×0%)/33=9%

10. Due to persistence, the instrument records the percent of forest that remains as (3×100%+30×~3.4%)/33=12%

11. While the instrument is required to be accurate to 1%, the error due to persistence is 3% (12% measured−9% actual).

Accordingly, image persistence can have a considerable negative effect on the performance of detector systems.

Figure 3A:
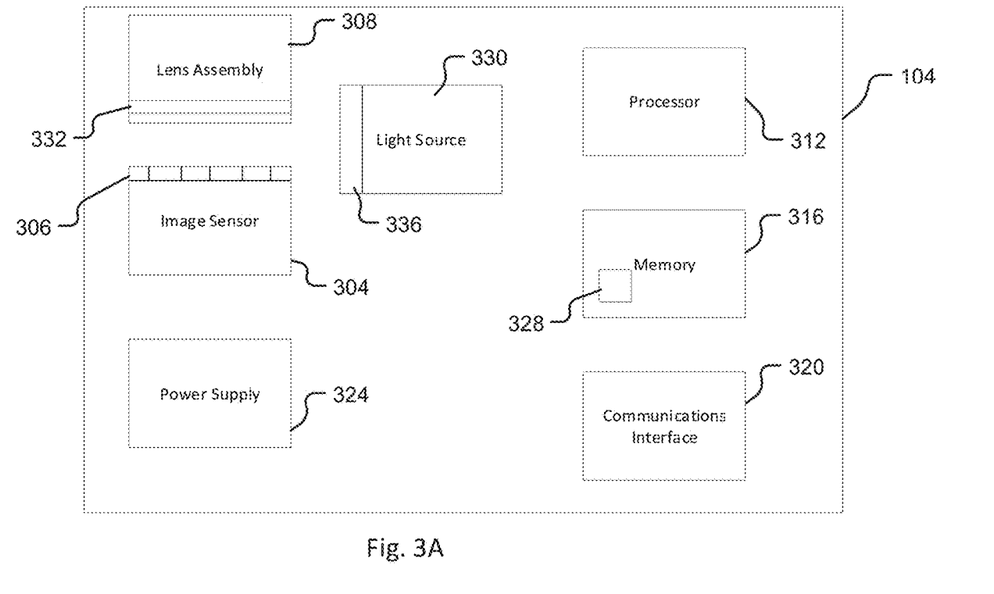
FIGS. 3A and 3B depict components of example sensor systems in accordance with embodiments of the present disclosure.
Figure 3B:
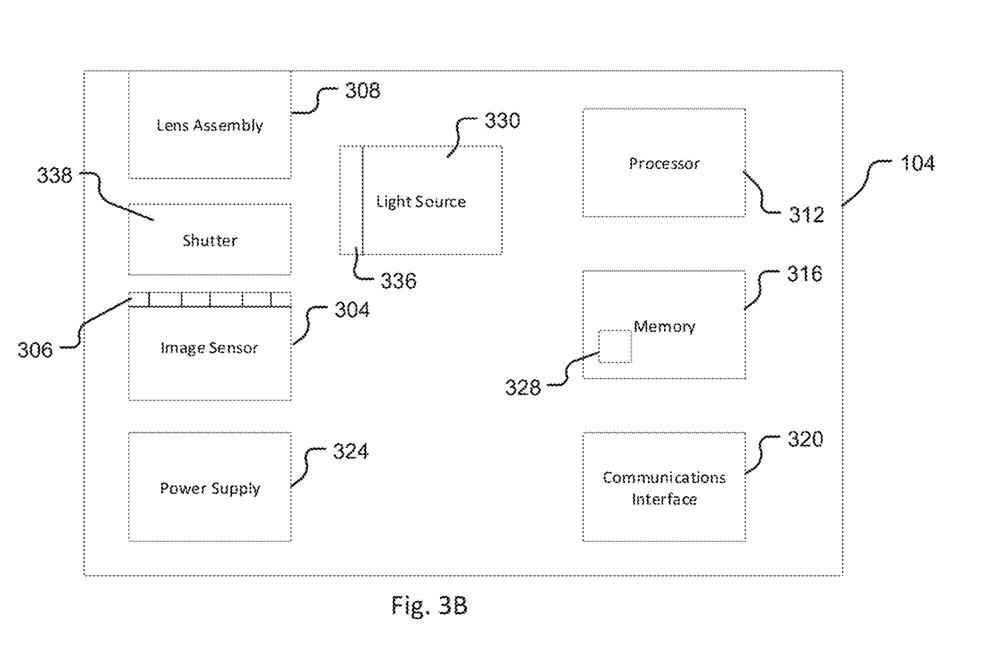

FIGS. 3A and 3B depict components of example sensor systems 104 in accordance with embodiments of the present disclosure. In general, the sensor system 104 depicted in FIG. 3A is in the form of a spectrometer, for example such as may be used to obtain data regarding the presence of particular elements or molecules in an imaged volume or area. The sensor system 104 depicted in FIG. 3B is in the form of a camera, for example as may be used to obtain the visible light image of a scene. A sensor system 104 in accordance with embodiments of the present disclosure can be carried by or mounted to a satellite, a space vehicle, an aircraft, a terrestrial vehicle, a ship, a tower, or other mobile or stationary platform 108. The sensor system 104 can include a detector or image sensor 304 that receives light from an optical or lens assembly 308. The operation of the image sensor 304 can be controlled by a processor 312 executing software or instructions 328 stored in a memory 316. The sensor system 104 can additionally include a communications interface 320 and a power supply 324.

The detector or image sensor 304 may incorporate a photosensitive site or array of photosensitive sites 306, commonly referred to as pixels, in which incident photons generate an electrical charge. As examples, but without limitation, the image sensor 304 may be in the form of a 1×n linear array of pixels, or an n×m two-dimensional array of pixels. For instance, in a spectrometer type sensor system 104, the image sensor 304 may include a 1×n (linear) array of pixels 306. As another example, in an imaging spectrometer type sensor system 104, the image sensor 304 may include an n×m (two dimensional) array of pixels 306. As a further example, in an imaging type sensor system 104, the image sensor 304 may include an n×m (two dimensional) array of pixels 306. As still a further example, the image sensor 304 may be capable of providing time of flight information and can thereby provide information regarding distance. In accordance with embodiments of the present disclosure, the image sensor 304 can include a frontside or backside illuminated CMOS image sensor or a CCD image sensor. Moreover, the image sensor 304 can include pixels 306 formed in a common substrate, with the material of the substrate selected depending on various factors, including the operating wavelengths of the image sensor 304. The image sensor 304 can also include or can be associated with driver and analog to digital conversion (ADC) circuitry, enabling the image sensor 304 to provide a digital output representative of an amplitude or intensity of light detected at each pixel 306 within the image sensor 304. The lens assembly 308 is oriented to collect light from within the field of view 116. As can be appreciated by one of skill in the art after consideration of the present disclosure, the lens assembly 308 can include refractive, reflective, diffractive, or other optical elements.

The sensor system 104 processor 312 can include a general purpose programmable processor, graphics processing unit (GPU), a field programmable gate array (FPGA), controller, or other processing device or set of devices capable of executing instructions for operation of the image sensor system 104. The instructions executed by the processor 312 can be stored as application programming 328 in the memory 316. The memory 316 can include one or more volatile or nonvolatile solid-state memory devices, such as but not limited to RAM, SDRAM, or the like. Alternatively or in addition, the memory 316 can include one or more mass storage devices, such as, but not limited to, hard disk drives, optical storage devices, solid-state drives, or the like. In addition to providing storage for the application programming 328, the memory 316 can store intermediate or final data products or other data or reference information, such as but not limited to collected sensor or image data, intermediate reference images or data, final reference images or data, uncorrected images, and corrected images.

The sensor system 104 can additionally include a light source 330. The light source 330 may be positioned to direct output light to all of the photosensitive sites 306 of the image sensor 304, either directly, through a saturated light optical assembly 336 included in or associated with the light source 330, through at least portions of the optical assembly 308, or through various combinations of such structures. As an example, if provided, a saturated light optical assembly 336 can include a waveguide, light pipe, mirror, and/or lens assembly that delivers sufficient light from the light source 330 to saturate each of the pixels 306 of the image sensor 304. The light output by the light source 330 may encompass at least the wavelengths of light to which the image sensor 304 is sensitive. In accordance with at least some embodiments of the present disclosure, the light source 330 is in the form of a light emitting diode (LED) or set of LEDs.

With particular reference now to FIG. 3A, the sensor system 104 can include an optical assembly 308 with a wavelength dispersive (diffractive, refractive, and/or interference) element 332. The wavelength dispersive element 332 is configured such that light of different wavelengths collected by the optical assembly 308 is incident on different pixels or sets of pixels 306 of the image sensor 304. Accordingly, the sensor system 104 in at least some embodiments of the present disclosure operates as a spectrometer capable of detecting the presence of selected elements or molecules within a target volume 112. As a particular example, but without limitation, the sensor system 104 can be operated to detect the presence of ozone, methane, or other trace gasses within a target volume 112.

With particular reference now to FIG. 3B, the sensor system 104 can include an optical assembly 308 that collects light from within a field of view 116, and focuses that light onto a focal plane that includes an image sensor 304 having a two-dimensional array of pixels. In this example embodiment, the sensor system 104 additionally includes a shutter mechanism 338, which can be operated to control the timing and duration of exposure of the image sensor 304 pixels to incident light. Accordingly, the sensor system 104 in at least some embodiments of the present disclosure operates as an imaging camera.

Persistence in image sensors 304 is caused by residual charge remaining in image sensor pixels 306 following a detection operation in which the pixels 306 have been exposed to incident light, and in response have generated some amount of electrical charge. This residual charge can affect the quality of subsequent capture operations performed using the image sensor 304. Specifically, charge captured in traps within pixels 306 during a prior illumination period can be released at a later time corresponding to a subsequent illumination period, thereby corrupting the subsequent image data. For example, in an image sensor 304 included in a spectrometer type sensor system 104, the concentration of elements or molecules within a monitored volume 112 may be inaccurate due to persistence from earlier light collection operations. As another example, in an image sensor 304 included in an imaging type sensor system 104, the clarity of an image collected by the sensor system 104 may be adversely affected by persistence from an earlier imaging operation. For instance, a "ghost" of an image collected during an earlier imaging operation may be present in an image acquired during a later imaging operation.

In accordance with embodiments of the present disclosure, persistence is mitigated or eliminated by saturating the pixels 306 of the image sensor 304 with light prior to collecting image data. As used herein, an "image" or "image data" can refer to any photo detection process performed by a sensor 304 included in a sensor system 104 in accordance with embodiments of the present disclosure, including in connection with the collection of diffracted light by a spectrometer type sensor system 104, the collection of light transmitted and received in connection with a ranging operation, or the collection of light in connection with an imaging operation. Moreover, collected images may be formed from light that includes or extends across visible and/or other wavelengths. Following saturation of the pixels 306, the image sensor 304 is reset. In accordance with the least some embodiments of the present disclosure, following the saturation and reset operations, the desired image can be obtained. In accordance with further embodiments of the present disclosure, following the saturation of the image sensor 304 and the subsequent reset operation, an image of a dark screen or area can be obtained, and the resulting image, referred to herein as a gray image can be saved as a reference image. In accordance with still further embodiments of the present disclosure, the steps of saturating the image sensor 304, resetting, obtaining an image of a dark screen or area, and saving the resulting image can be performed multiple times, and the multiple gray images thus obtained can be averaged to form a reference image. Following the formation or acquisition of a reference image, the pixels 306 of the image sensor 304 can again be saturated and reset, and a desired image can be obtained. The reference image is then subtracted from the desired image, to form a corrected or final image.

Figure 4:
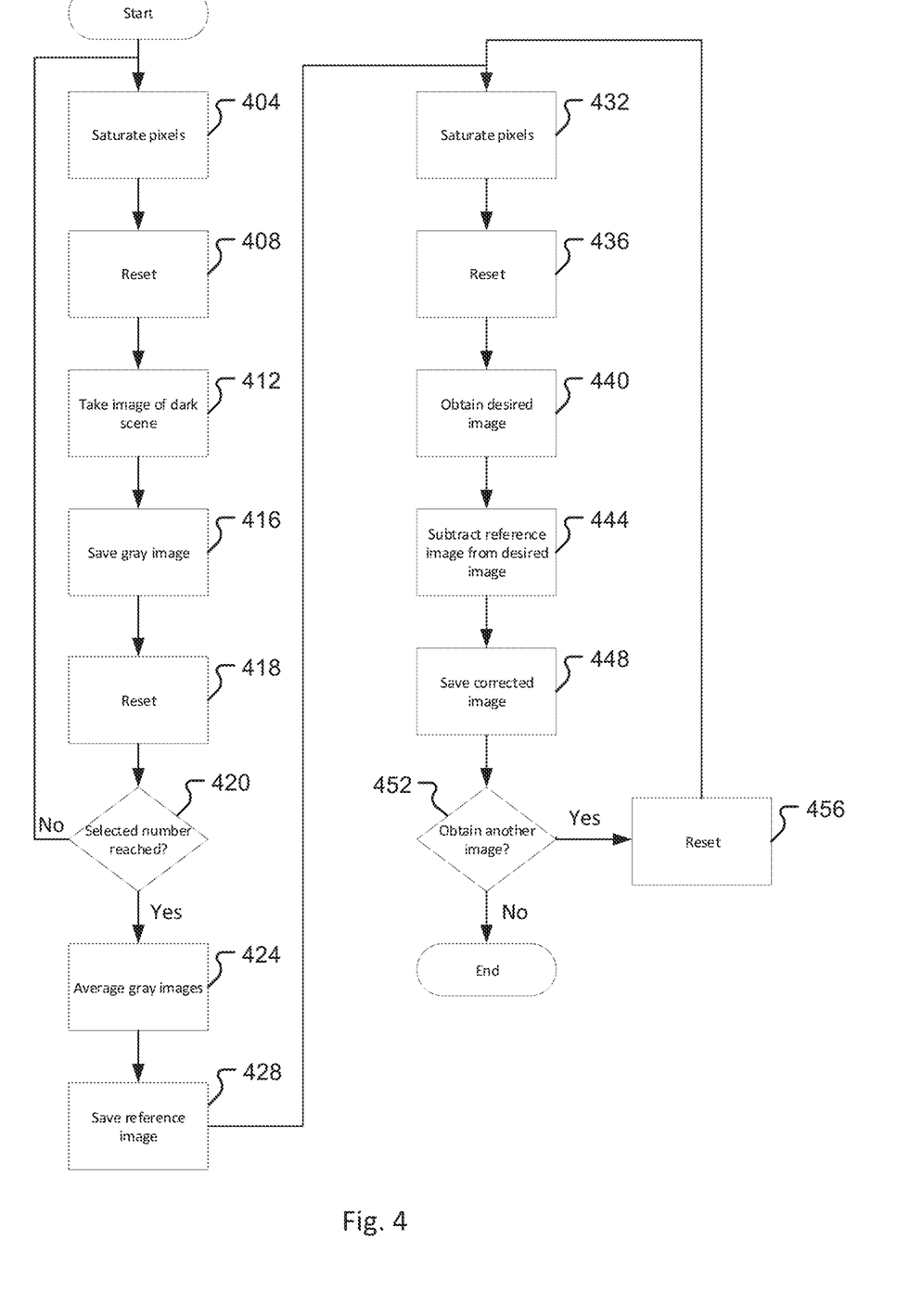
FIG. 4 is a flowchart depicting aspects of a process in accordance with embodiments of the present disclosure for mitigating the effect of image sensor persistence originating from previous image sensor operations.

FIG. 4 is a flowchart depicting aspects of a process for mitigating the effect of detector or image sensor 304 persistence on images obtained using the image sensor 304. Initially, a calibration process is performed. As part of the calibration process, the image sensor 304 is saturated with illumination light. For example, the image sensor 304 can be operated to take an image that saturates the pixels 306 of the image sensor 304 with input light in an amount outside of (above) the dynamic range of the image sensor pixels 306, thereby saturating those pixels with the electrical charge (step 404). In particular, the image sensor 304 is illuminated with an amount of light sufficient to substantially fill all of the charge traps within the pixels 306. The light used to saturate the image sensor 304 can extend across all or portions of the operating wavelengths of the image sensor 304. The image used to saturate the pixels can be for example an image taken of a bright white screen or target. Alternatively, the image used to saturate the pixels of the image sensor 304 can be taken while a light source 330 provided as part of the sensor system 104 is operated to illuminate the pixels 306 of the image sensor 304, directly, through a lens assembly 308 or other optical system, or by reflecting light from the light source 330 off of a white screen or target. As can be appreciated by one of skill in the art after consideration of the present disclosure, the pixels 306 of the image sensor become saturated when they are exposed to an amount of illumination light above the maximum amount that can be measured by those pixels 306. That is, the amount of light during a step of saturation exceeds the dynamic range of the image sensor 304.

After saturating the pixels 306 of the image sensor 304, the image sensor 304 is reset (step 408). Next, the image sensor is operated to obtain an image of a black scene or target (step 412). The image of the black scene or target is taken using an exposure or integration time that is the same as or about equal to the standard exposure or integration time. For example, the standard integration time can be an amount of time that is within a range of typical integration times for collecting an image from a scene. In accordance with the least some embodiments of the present disclosure, the image of a black scene or target can be obtained by pointing the field of view 116 of the sensor system 104 such that it encompasses a dark area of the sky. In accordance with still other embodiments of the present disclosure, the image of a black scene or target can be obtained by closing a shutter 338 included in the sensor system 104. Due to the persistence characteristics of the image sensor 304, the image produced by the image sensor 304 as a result of taking an image of the black scene is a gray image. The gray image is then saved to memory 316 (step 416). As can be appreciated by one of skill in the art after consideration of the present disclosure, the gray image represents an image of the persistence characteristics of the image sensor 304. The image sensor 304 can then be optionally reset (step 418). In particular, prior to collecting a desired image, as discussed below, the signal sensor 304 needs to be reset. However, it should be noted that resetting prior to further steps of saturating the image sensor 304 is optional. The basic calibration process is then complete.

In order to reduce the influence of read noise and other random signals, the basic calibration process steps of optionally resetting the image sensor 304, flooding the image sensor 304 with light, again resetting the image sensor 304, obtaining an image of a black scene or target, and saving the resulting gray image can be repeated a selected number of times. For example, but without limitation, the steps can be repeated 100 times. Accordingly, at step 420, a determination is made as to whether the selected number of gray images have been obtained. If not, the process returns to step 404. After the selected number of gray images have been obtained, those images are averaged, to obtain a dark persistent reference image (step 424). The reference image is then stored in the memory 316 (step 428).

Following basic calibration, the process of obtaining a desired image can be performed. In particular, at step 432, an image is taken under conditions that saturate all of the pixels 306 of the image sensor 304. As before, this can be performed by taking an image of a white screen or target, illuminating the pixels 306 using a local illumination source 330, or by reflecting light from the light source 330 off of a white screen or target. The image sensor 304 is then reset (step 436). Next, the sensor system 304 is operated to obtain a desired image (step 440). In at least some embodiments of the present disclosure, the desired image is collected using the same timings (i.e. integration time) used during the collection of the black scene or target (step 412).

As can be appreciated by one of skill in the art after consideration of the present disclosure, obtaining a desired image can include pointing the sensor system 104 such that the field of view 116 encompasses a desired scene 114 or target volume 112, and collecting light directed to the image sensor 304 by the lens or optical assembly 308 within the included pixels 306 for a selected period of time. The dark persistent reference image that was saved to the system at step 428 is then subtracted from the obtained desired image, to create a corrected image (step 444). The corrected image can then be stored in memory 316 and/or transmitted to another system or device by the communication interface 320 (step 448).

At step 452, a determination can be made as to whether another image is to be obtained, or whether the process is to end. Notably, if another image is to be obtained, the process of collecting a subsequent image first involves optionally resetting the image sensor 304 (step 456), saturating the pixels at step 432, and then resetting the image sensor 304 at step 436. The desired next image can then be obtained (step 440). As can be appreciated by one of skill in the art after consideration of the present disclosure, the next image can be taken from the same or a different point of view. In addition, the next image can be taken as soon as the steps of optionally resetting, saturating the pixels 306, and again resetting have been completed. If one wants to wait some additional period of time, for example to wait until a desired scene or object comes into the field of view, the process of saturating the pixels at step 432 is again performed, such that the desired image (obtained at step 440) is collected immediately or nearly immediately after the sensor 204 is reset (at step 436) in order to prevent a time period occurring in which a significant number of the traps release their charge. The saturation of the image sensor 304 pixels 306 between desired image collect operations has the effect of normalizing the image sensor 304. The step of subtracting the reference image obtained during the basic calibration process from the obtained desired image has the effect of largely removing the influence of charge remaining in the pixels 306 following the saturation step from the final (i.e. the corrected) image. Moreover, the same reference image obtained during the basic calibration process is subtracted from any of the obtained desired images to create a corrected image. Alternatively, the basic calibration process can be repeated between certain numbers of image collects, after selected periods of time have elapsed, or for other reasons.

For precise measurements, image sensors are typically fully calibrated prior to use to characterize their photoresponse, i.e. the signal they produce when illuminated with a certain quantity of light. This full calibration is performed using the same timings (i.e. integration time, saturation time, reset time) to be used during the operation of the sensor. In accordance with at least some embodiments of the present disclosure, the photoresponse of the image sensor 304 can be characterized following the described steps of saturation and reset. Full calibration in accordance with at least some embodiments of the present disclosure can include determining the response of individual pixels 306 to different, known levels of incident light following saturation and resetting of the image sensor 304, and then recording correction values for different pixels 306 at different illumination values.

In accordance with still other embodiments of the present disclosure, the photoresponse of the image sensor 304 can be characterized using the "processed image data"/"corrected image". Full calibration in accordance with still other embodiments of the present disclosure can include determining the response of individual pixels 306 in the "processed image data"/"corrected image" to different, known levels of incident light and then recording correction values for different pixels 306 at different illumination values. In particular, the full calibration of the image sensor 304 is completed using the "processed image data"/"corrected image". In accordance with at least some embodiments of the present disclosure, the steps of saturating and resetting the image sensor 304 are always performed immediately prior to obtaining a desired image. Moreover, these steps can be performed without the imposition of intentional or added delay. For example, these steps are performed at the rate available through exposure of the image sensor 304 for typical exposure periods, read out and resetting of the image sensor 304, and execution of the application programming 328 by the processor 312. In accordance with further embodiments of the present disclosure, the various steps of the process are performed at consistent intervals. For example, the intervals at which steps of saturating the pixels 306, resetting the image sensor 304, and obtaining an image of a dark scene as performed during the basic calibration process are the same as the intervals at which the steps of saturating the pixels 306, resetting the image sensor 304 and obtaining a desired image are performed during the acquisition of desired images. Moreover, the exposure periods during the saturation steps and the exposure periods and amounts during steps involving the collection of gray images can be the same throughout basic calibration and image collection, and these exposure periods and amounts can be within a range corresponding to a range of typical exposure periods and amounts applied by the image sensor 304 during normal imaging acquisition operations. As an example, but without limitation, the image sensor 304 can be operated to obtain images at a rate of about 20 frames per second, with a little less than a 50 millisecond integration time per frame.

Figure 5:
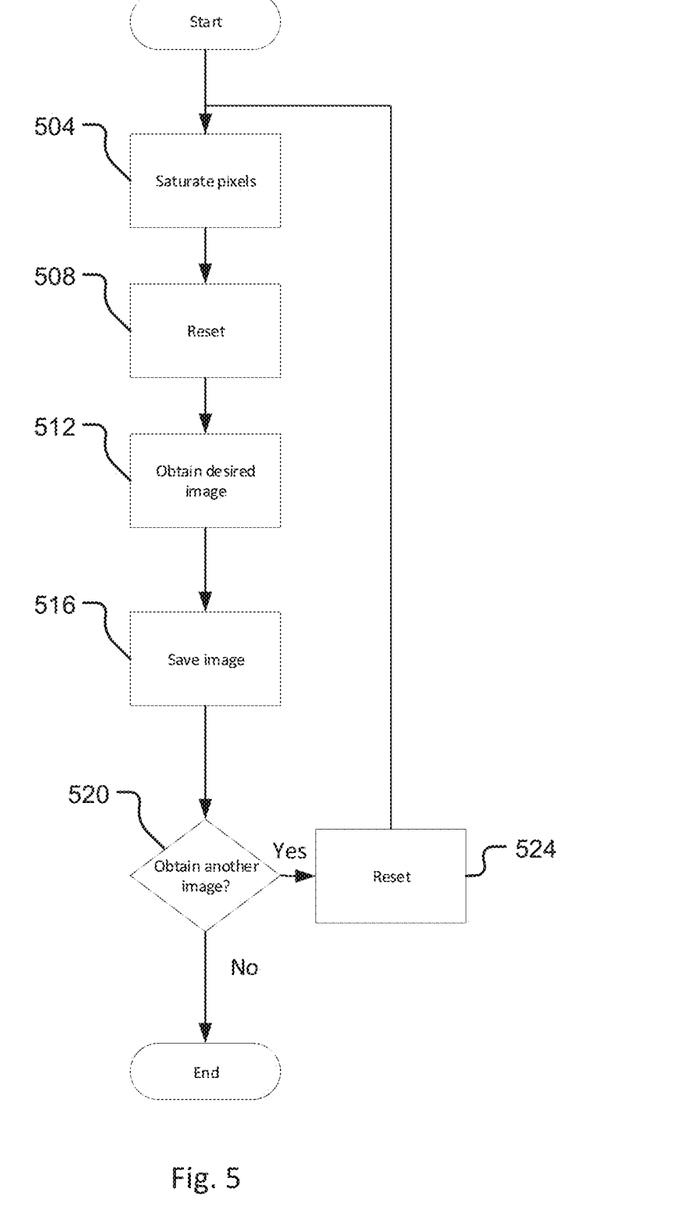
FIG. 5 is a flowchart depicting aspects of another process in accordance with embodiments of the present disclosure for mitigating the effect of image sensor persistence originating from previous image sensor operations.

With reference now to FIG. 5, aspects of an alternative process for mitigating the effect of detector or image sensor 304 persistence on images obtained using the image sensor 304 are depicted. Initially, at step 504, the pixels 306 of the image sensor 304 are saturated with input light. Next, the image sensor 304 is reset (step 508). A desired image is then obtained using the image sensor 304 (step 512). The obtained image can then be saved (step 516). At step 520, a determination is made as to whether another image should be obtained. If yes, the image sensor 304 is optionally reset (step 524), and the process returns to step 504. Alternatively, the process can end. In such embodiments, the saturation and reset of the pixels 306 between the acquisition of desired images can improve the consistency of the desired image collects, at least as compared to image collects obtained immediately following prior image collects, without intervening saturation of the image sensor 304 pixels 306. For example, the ghosting effect from the detailed structure in a prior image, such as discussed in connection with FIG. 2 of the present application, can be avoided or mitigated. In addition, a reduction in ghosting due to prior image acquisition operations can be achieved where the steps of image sensor 304 saturation, reset, and image collection can be performed at a maximum operational rate of the image sensor. Accordingly, ghosting from the detailed structure in a prior image can be reduced or eliminated without requiring additional wait times between the saturation, reset, and image acquisition steps.

Although the processes described herein can be performed entirely within components of a sensor system 104, other arrangements are possible. For example, the subtraction of a dark persistent reference image from obtained images can be performed in a system that is separate and/or remote from the sensor system 104.

Without wishing to be bound by any particular theory, by saturating the pixels of the image sensor 304 between each image acquisition, artifacts of a previous image that would otherwise be present in a subsequent image due to image sensor persistence are removed. In particular, by filling all the traps in the photo sensitive areas of the image sensor 304 between image data collects, the image sensor 304 is effectively "bleached" between image data collects, where the bleaching removes the detailed persistent image effects that would otherwise be present as a result of collecting the prior image. In addition, by subtracting the dark persistent reference image from an obtained desired image, the effect of persistence due to the decay characteristics of the image sensor 304 following saturation of the image sensor pixels 306 can be removed from the obtained desired image. In other words, by subtracting the dark persistent reference image, the process compensates for the different absolute decay rates of the different pixels 306 within the image sensor 304.

In accordance with further embodiments of the present disclosure, the creation of a (dark) reference image is not required. Instead, the process can include saturating the image sensor, resetting the image sensor, and then collecting a desired image. Although this process may suffer some persistence effects resulting from the saturation step, it will provide an image that is entirely or substantially free of detailed structure persistence resulting from a prior collection of a desired image.

Another way to visualize the process of embodiments of the present disclosure using the cat and bird images example of FIG. 2 is as follows:

1. Take an image of a bright white screen or flash/flood the detector to saturate the image sensor 304;
2. Reset the image sensor 304;
3. Take an image of a black screen which will now look like a gray screen—call this a gray image;
4. Save the gray image;
5. Optionally reset the image sensor 304
6. Saturate the image sensor 304
7. Reset the image sensor 304
8. Take the image of the cat
9. Subtract the gray image from the image of the cat to get an image of the cat without or with reduced effects of persistence
10. Saturate the image sensor 304
11. Reset the image sensor 304
12. Take the image of the bird
13. Subtract the image of the gray screen from the image of the bird to get an image of the bird without persistence and without a ghost image of the cat in the background.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
calibrating an image sensor, including:
saturating the image sensor with input light;
after saturating the image sensor with input light, resetting the image sensor;
after resetting the image sensor, operating the image sensor to take a first image of a dark scene; and
generating a reference image, wherein the reference image is at least in part based on the first image of the dark scene; and
obtaining a first corrected image, including:
saturating the image sensor with input light;
after saturating the image sensor with input light, resetting the image sensor;
after resetting the image sensor, operating the image sensor to obtain a first desired image; and
subtracting the reference image from the first desired image to form the first corrected image.

2. The method of claim 1, further comprising:
resetting the image sensor after the step of generating a reference image, and before the step of obtaining a first corrected image.

3. The method of claim 1, wherein the reference image is the first image of the dark scene.

4. A method, comprising:
calibrating an image sensor, including:
saturating the image sensor with input light;
resetting the image sensor;
operating the image sensor to take a first image of a dark scene; and
generating a reference image, wherein the reference image is at least in part based on the first image of the dark scene; and
obtaining a first corrected image, including:
saturating the image sensor with input light;
resetting the image sensor;
operating the image sensor to obtain a first desired image; and
subtracting the reference image from the first desired image to form the first corrected image; and
the method further comprising:
after operating the image sensor to take the first image of the dark scene, repeating the steps of saturating the image sensor with input light, resetting the image sensor, and operating the image sensor to take a second image of the dark scene, wherein the reference image is an average of the first and second images of the dark scene.

5. The method of claim 4, further comprising:
obtaining a second corrected image, including:
saturating the image sensor with input light;
resetting the image sensor;
operating the image sensor to obtain a second desired image; and
subtracting the reference image from the second desired image to form the second corrected image.

6. The method of claim 1, further comprising:
after operating the image sensor to take the first image of the dark scene, resetting the image sensor, saturating the image sensor with input light, resetting the image sensor, and operating the image sensor to take a second image of the dark scene, wherein the reference image is an average of the first and second images of the dark scene.

7. The method of claim 1, wherein saturating the image sensor with input light includes illuminating the image sensor with light from a light source.

8. The method of claim 1, wherein the first image of a dark scene is an image of a black screen.

9. The method of claim 1, wherein the first image of a dark scene is an image of a dark area of sky.

10. The method of claim 1, wherein the image sensor includes a plurality of pixels.

11. The method of claim 10, wherein the plurality of pixels are arranged in a one-dimensional array or a two-dimensional array.

12. The method of claim 11, wherein the image sensor is operated as a spectrometer.

13. The method of claim 11, wherein the first desired image is an image of a scene.

14. The method of claim 6, wherein each of the images of the dark scene are collected over a standard integration time.

15. A method, comprising:
first saturating a plurality of pixels of an image sensor with input light, wherein first saturating the plurality of pixels of the image sensor includes exposing all of the pixels in the plurality of pixels of the image sensor to an amount of illumination light above a maximum amount that can be measured by the pixels in the plurality of pixels of the image sensor;
after first saturating the plurality of pixels of the image sensor, first resetting the plurality of pixels of the image sensor; and
immediately after first resetting the plurality of pixels of the image sensor, using the plurality of pixels of the image sensor to collect a first image that includes light from a first scene.

16. The method of claim 15, further comprising:
after collecting the first image, second resetting the plurality of pixels of the image sensor; and
after second resetting the plurality of pixels of the image sensor, second saturating the plurality of pixels of the image sensor;
after second saturating the plurality of pixels of the image sensor, third resetting the plurality of pixels of the image sensor; and
after third resetting the plurality of pixels of the image sensor, using the plurality of pixels of the image sensor to collect a second image that includes light from the first scene or a second scene.

17. The method of claim 15, further comprising:
after collecting the first image, second saturating the plurality of pixels of the image sensor;
after second saturating the plurality of pixels of the image sensor, second resetting the plurality of pixels of the image sensor; and
after second resetting the plurality of pixels of the image sensor, using the plurality of pixels of the image sensor to collect a second image that includes light from the first scene or a second scene.

18. An imaging system, comprising:
an image sensor, wherein the image sensor includes a plurality of pixels;
a lens assembly, wherein the lens assembly directs incident light to the image sensor;
a light source, wherein the light source is operable to provide light to the image sensor;
a memory; and
a processor,
wherein the processor controls the light source to provide light to the image sensor, wherein the light provided by the light source to the image sensor saturates the plurality of pixels of the image sensor, wherein saturating the plurality of pixels of the image sensor includes exposing all of the pixels in the plurality of pixels of the image sensor to an amount of illumination light above a maximum amount that can be measured by the pixels in the plurality of pixels of the image sensor, and wherein following saturating the plurality of pixels of the image sensor the processor operates the image sensor to take an image of a scene of interest.

19. The imaging system of claim 18, wherein following saturating the plurality of pixels of the image sensor the processor controls the image sensor to take an image of a dark scene, wherein the processor stores the image of the dark scene as a reference frame, and wherein the reference frame is subtracted from the image of the scene of interest.

20. The imaging system of claim 19, wherein the plurality of pixels of the image sensor are disposed in an array of pixels.

21. The imaging system of claim 20, further comprising:
a saturated light optical assembly, wherein the saturated light optical assembly is operable to guide light from the light source to the image sensor.

22. The imaging system of claim 21, further comprising:
a shutter, wherein the shutter controls an exposure of the image sensor to incident light directed to the image sensor by the lens assembly.

23. The method of claim 17, further comprising:
resetting the plurality of pixels of the image sensor immediately after collecting the first image and before second saturating the plurality of pixels of the image sensor, wherein the first saturating the plurality of pixels and the second saturating the plurality of pixels includes operating a light source to illuminate the plurality of pixels with light that extends across at least portions of operating wavelengths of the plurality of pixels.

* * * * *